United States Patent
Srinivasan et al.

(10) Patent No.: US 11,290,243 B2
(45) Date of Patent: Mar. 29, 2022

(54) METHOD AND SYSTEM FOR TRANSMITTING DOWNLINK CONTROL INFORMATION TO USER EQUIPMENT (UE)

(71) Applicant: Samsung Electronics Co., Ltd., Suwon-si (KR)

(72) Inventors: Nithin Srinivasan, Bangalore (IN); Godavarti Satya Venkata Uma Kishore, Bangalore (IN); Basant Prasad, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 16/635,907

(22) PCT Filed: Aug. 6, 2018

(86) PCT No.: PCT/KR2018/008916
§ 371 (c)(1),
(2) Date: Jan. 31, 2020

(87) PCT Pub. No.: WO2019/027307
PCT Pub. Date: Feb. 7, 2019

(65) Prior Publication Data
US 2020/0235895 A1 Jul. 23, 2020

(30) Foreign Application Priority Data

Aug. 4, 2017 (IN) .............................. 201741027825
Aug. 3, 2018 (IN) .............................. 2017 41027825

(51) Int. Cl.
*H04L 5/00* (2006.01)
*H04L 1/00* (2006.01)
*H04W 72/04* (2009.01)

(52) U.S. Cl.
CPC .......... *H04L 5/0094* (2013.01); *H04L 1/0026* (2013.01); *H04L 5/0039* (2013.01);
(Continued)

(58) Field of Classification Search
None
See application file for complete search history.

(56) References Cited

U.S. PATENT DOCUMENTS

2014/0328302 A1 11/2014 Park et al.
2017/0318563 A1* 11/2017 Yang .................... H04L 5/0051
(Continued)

OTHER PUBLICATIONS

LG Electronics, "Discussion on CSS configuration for wideband operation", R1-1707627, 3GPP TSG RAN WG1 Meeting #89, Hangzhou, China, May 6, 2017 See section 2.1; and figures 1, 3-4.
(Continued)

*Primary Examiner* — Saad Khawar
(74) *Attorney, Agent, or Firm* — Jefferson IP Law, LLP

(57) ABSTRACT

Embodiments herein provide a method for transmitting downlink control information to a User Equipment (UE) in a wireless communication system. The method includes segmenting a plurality of Aggregation Levels (ALs) across multiple bandwidth parts (BWPs) in a Physical Downlink Control Channel (PDCCH). Further, the method includes transmitting the plurality of segmented aggregation levels across multiple BWPs to one or more UEs. The segmented plurality of ALs comprises multiple combinations of ALs across multiple BWPs. The proposed method includes narrowing down the search space by signaling to the UE explicitly or implicitly the AL resources that the UE has to monitor to perform the decoding of the PDCCH. In some embodiments, the length of the control information formats is modified such that the UE needs to perform a minimum number of blind decoding attempts.

20 Claims, 17 Drawing Sheets

(52) U.S. Cl.
CPC .......... *H04L 5/0041* (2013.01); *H04L 5/0092* (2013.01); *H04W 72/042* (2013.01)

(56) References Cited

U.S. PATENT DOCUMENTS

| | | | | |
|---|---|---|---|---|
| 2020/0037323 A1* | 1/2020 | Song | .................. | H04L 5/003 |
| 2020/0112944 A1* | 4/2020 | Jiang | .................. | H04W 72/042 |

OTHER PUBLICATIONS

Mediatek Inc., "Structure of group-common PDCCH", R1-1710792, 3GPP TSGRAN WG1 NR Ad-Hoc#2, Qingdao, P.R. China, Jun. 17, 2017 See sections 2-3.

Nokia et al., "On the PDCCH control resource set and its connection to the search space for NR", R1-1710980, 3GPP TSG RAN WG1 NR Ad-Hoc#2, Qingdao, P.R. China, Jun. 17, 2017 See sections 2.3-2.4.

Interdigital Inc., "Control Channels Monitoring with Multiple CORESETs", R1-1709016, 3GPP TSG RAN WG1 Meeting #89, Hangzhou, P.R. China, May 6, 2017 See sections 2.1-2.2.

Intel Corporation, Ultra-reliability for NR PDCCH, Prague, Czech Republic, Aug. 21-25, 2017, R1-1712575.

Qualcomm Incorporated, "UE Power Consideration Based on Days-of-Use", Gothenburg, Sweden, Aug. 22-26, 2016, R1-166368.

Intel Corporation, "Ultra-reliability for NR PDCCH", Intel Corporation 3GPP TSG-RAN WG1 NR#3, Nagoya, Japan, Sep. 2017, R1-1716309.

Interdigital, Inc. "Considerations for ultra-reliable DCI transmission", Inter digital Inc, 3GPP TSG-RAN WG1 #90, Prague, Aug. 2017, R1-1714113.

LG Electronics, "Discussion on DL control with ultra-reliability requirement", LG Electronics, 3GPP TSG-RAN WG1 NR#3, Nagoya, Japan, Sep. 2017, R1-1715875.

NTT Docomo, Ind., "Revised WID on New Radio Access Technology", Sapporo, Japan, Sep. 11-14, 2017, RP-172115.

3rd Generation Partnership Project; Technical Specification Group Radio Access Network; Study on Scenarios and Requirements for Next Generation Access Technologies; TR38.913; Jun. 2017.

Ericsson, "NR High-Reliability URLLC scope for RAN1/RAN2", RP-172817.

* cited by examiner (Common Search Space)

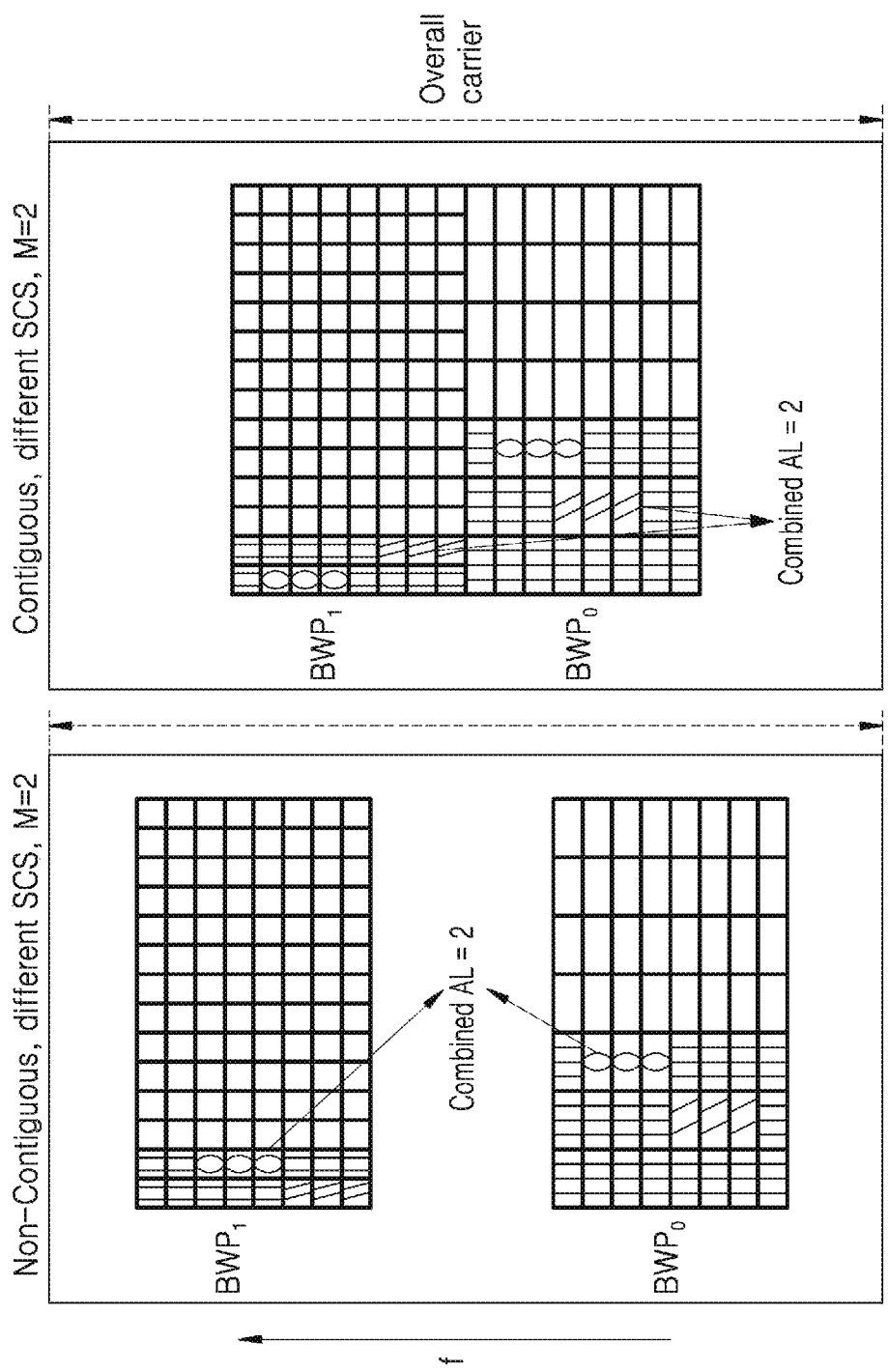

METHOD AND SYSTEM FOR TRANSMITTING DOWNLINK CONTROL INFORMATION TO USER EQUIPMENT (UE)

CROSS-REFERENCE TO RELATED APPLICATION(S)

This application is a U.S. National Stage application under 35 U.S.C. § 371 of an International application number PCT/KR2018/008916, filed on Dec. 6, 2018, which is based on and claimed the benefit priority of an Indian patent application number 201741027825, filed on Aug. 4, 2017, and an Indian patent application number 201741027825, filed on Aug. 3, 2018, in the Indian Intellectual Property Office, the entire disclosure of each of which is hereby incorporated by reference herein in its entirety.

TECHNICAL FIELD

The present invention relates to a wireless communication system. More particularly, it is related to a method and system for transmitting downlink control information to a User Equipment (UE). The present application is based on, and claims priority from an Indian Application Number 201741027825 filed on 4 Aug. 2017, the disclosure of which is hereby incorporated by reference herein.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The Long Term Evolution (LTE) is a mobile broadband wireless communication technology in which transmissions from base stations (referred to as eNodeBs or eNBs in 3GPP documentation) to mobile stations (referred to as user equipment, or UEs, in 3GPP documentation) are sent using orthogonal frequency division multiplexing (OFDM). The OFDM splits the transmitted signal into multiple parallel sub-carriers in frequency.

Various messages transmitted over a radio link to the UEs can be broadly classified as control messages or data messages. Control messages are used to facilitate the proper operation of the system as well as proper operation of each UE within the system. Control messages include commands to control functions such as the transmitted power from a UE, signaling of RBs within which the data is to be received by the UE or transmitted from the UE, and so on. Specific allocations of time-frequency resources in the LTE signal to system functions are referred to as physical channels. For example, the physical downlink control channel (PDCCH) is a physical channel used to carry scheduling information and power control messages.

Further, the 3GPP is considering the configuration of multiple BWPs (Bandwidth Parts) for a New Radio (NR) i.e., a 5G UE monitoring a wideband single carrier. Each BWP is associated with a Subcarrier spacing (SCS) and a bandwidth as shown in the FIG. 1.

In the same context, the 5G UE can receive control information on the New Radio-Physical Downlink Control Channel (NR-PDCCH) in all or a subset of the configured BWPs.

Further, it is also considered that the BWPs assignment can be contiguous, non-contiguous or overlapped in frequency i.e., essentially Frequency Division Multiplexed (FDMed). The UE performs blind decoding attempts of the PDCCH in LTE/LTE-A legacy systems.

The FIG. 2 depicts a schematic representation of a frame structure of an LTE/LTE-A system consisting of P symbols in the time domain and Q subcarriers in the frequency domain. The first three symbols are dedicated for PDCCH resources and consist of two search spaces (set of resources).

The common search space (CSS) and the UE specific search space (USS) (i.e., other than the CSS) are illustrated in the FIG. 2.

The resources used for signaling the control information are mapped into Control Channel Elements (CCE) which in turn consist of a set of Resource Element groups (REGs) which consist of 9 RE's in LTE/LTE-A and 6 RE's in NR 3GPP. It is assumed that the FIG. 1 represents the different set of CCEs.

Within the USS, the CCEs are divided based on the aggregation level (AL). The classifications are as mentioned in the FIG. 2.

The FIG. 2 is only a representation of the CCE allocation/ ALs and does not represent the actual CCE allocation which is based on specification. Now, since the UE does not know a priori which CCEs have been assigned, the UE performs blind decoding on all the possible CCEs with all possible ALs. Further, each AL can be associated with a certain number of PDCCH candidates. Furthermore, each candidate can have up to two control channel information formats (Downlink Control Information (DCI)/Uplink Control Information (UCI)).

Hence, the total number of blind decoding attempts for an AL (x) would be the number of PDCCH candidates at AL (x) multiplied by 2. The blind decoding is performed on both the CSS and then on the USS. The UE recognizes the information relevant to it by using a Radio Network Temporary Identifier (RNTI) as assigned by the base station.

The one or multiple bandwidth part configurations for each component carrier can be semi-statically signalled to a UE. Some generic information related to bandwidth part is described herein.

A bandwidth part consists of a group of contiguous Pseudo-Random Binary sequence (PRBs). Reserved resources can be configured within the bandwidth part. The bandwidth of a bandwidth part equals to or is smaller than the maximal bandwidth capability supported by a UE. Further, the bandwidth of a bandwidth part is at least as large as the SS block bandwidth. The bandwidth part may or may not contain the SS block.

Configuration of a bandwidth part for RRC connected mode UE may include the following properties:

Numerology

Frequency location (e.g. center frequency)

Bandwidth (e.g. number of PRBs)

Indication to the UE which bandwidth part configuration (when multiple BWPs) shall be assumed for resource allocation at a given time includes the following:

Each bandwidth part is associated with a specific numerology (subcarrier spacing, CP type).

Slot duration indication if the base station decides to not to down-select between 7 symbol and 14 symbols for NR slot duration.

The UE expects at least one DL bandwidth part and one UL bandwidth part being active among the set of configured bandwidth parts for a given time instant.

The UE is only assumed to receive/transmit within active DL/UL bandwidth part(s) using the associated numerology, i.e., at least PDSCH and/or PDCCH for DL and PUCCH and/or PUSCH for UL. If multiple bandwidth parts with same or different numerologies can be active for a UE simultaneously, then:

It does not imply that it is required for UE to support different numerologies at the same instance.

TB to bandwidth part mapping

The active DL/UL bandwidth part is not assumed to span a frequency range larger than the DL/UL bandwidth capability of the UE in a component carrier.

Specify necessary mechanism to enable UE RF retuning for bandwidth part switching Currently in LTE/LTE-A systems, the PDCCH is blindly decoded. The PDCCH consists of the Downlink Control Information (DCI) or the Uplink Control Information (UCI) necessary for the UE to perform Uplink/Downlink (UL/DL) transmissions. The same is expected for New Radio (NR), 5G systems.

Considering the number of DCI formats according to LTE-A Release-10, the UE has to perform 60 blind decoding attempts. The result of the analysis shows that an average UE spends a significant amount of time performing a blind decoding of the PDCCH leading to unnecessary power consumption. Therefore, by reducing the number of blind decoding attempts at the UE of the PDCCH, the UE power consumption can be reduced.

TABLE 1

| Search Space Type | Aggregation Level | Size in CCEs | Number of PDCCH Candidates |
|---|---|---|---|
| USS | 1 | 6 | 6 |
|  | 2 | 12 | 6 |
|  | 4 | 8 | 2 |
|  | 8 | 16 | 2 |
| CSS | 4 | 16 | 4 |
|  | 8 | 16 | 2 |

From the above table 1, it is clear that the total number of blind decoding attempts (USS+CSS) is 60. Thus, it is important to reduce the total number of blind decoding attempts of the PDCCH.

The above information is presented as background information only to help the reader to understand the present invention. Applicants have made no determination and make no assertion as to whether any of the above might be applicable as Prior Art with regard to the present application.

Technical Solution

The principal object of the embodiments herein is to provide a method and system transmitting downlink control information to a User Equipment (UE).

Another object of the embodiments herein is to segment a plurality of Aggregation Levels (ALs) across multiple bandwidth parts (BWPs) in a Physical Downlink Control Channel (PDCCH).

Another object of the embodiments herein is to transmit the plurality of segmented aggregation levels across multiple BWPs to one or more UEs.

Another object of the embodiments herein is to indicate a location of the plurality of ALs on one or more BWPs among the plurality of BWPs in one BWP.

Another object of the embodiments herein is to transmit at least one AL on a single BWP to the UE.

Another object of the embodiments herein is to segment a length of downlink control information (DCI) across multiple bandwidth parts (BWPs) in a Physical Downlink Control Channel (PDCCH).

Another object of the embodiments herein is to transmit the segmented DCI across multiple BWPs to one or more UEs.

DESCRIPTION OF DRAWINGS

This invention is illustrated in the accompanying drawings, throughout which like reference letters indicate corresponding parts in the various figures. The embodiments herein will be better understood from the following description with reference to the drawings, in which:

FIG. 6A shows splitting the Aggregation Level (AL) resources across the multiple active bandwidth parts (BWPs), according to the embodiments as disclosed herein;

MODE FOR INVENTION

Figure 1:
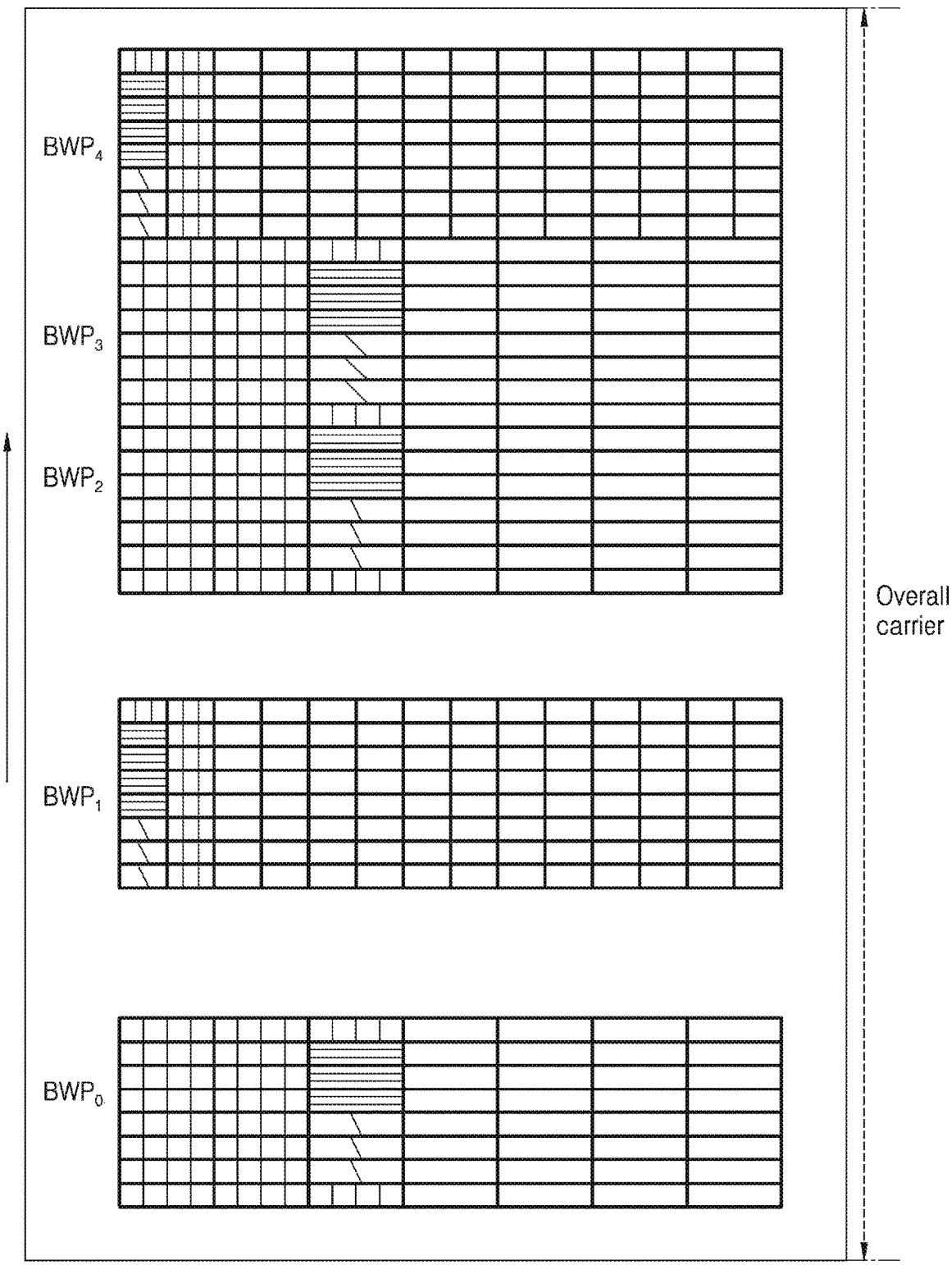
FIG. 1 illustrates multiple active BWPs in a single wideband carrier, according to a prior art.
Figure 2:
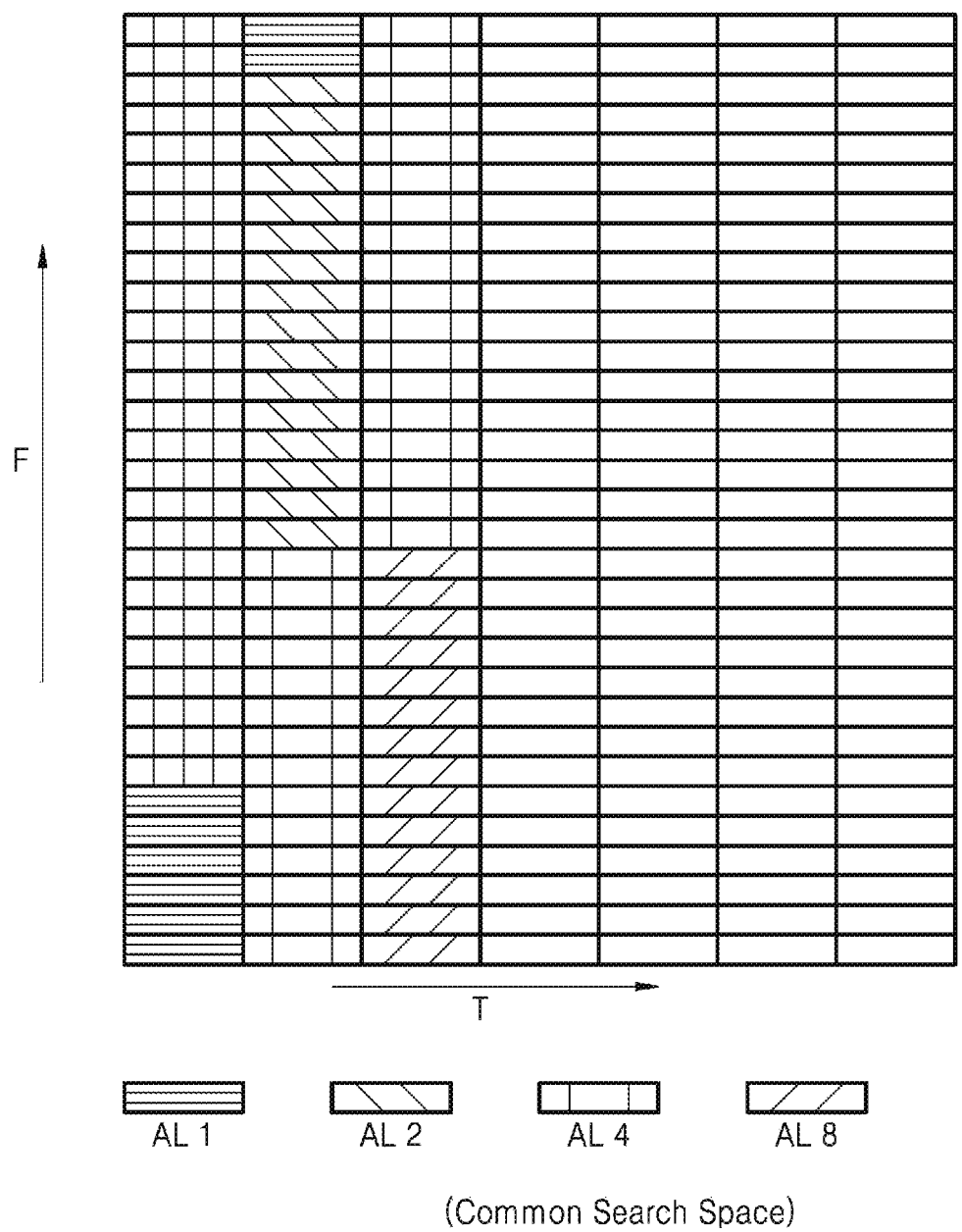
FIG. 2 illustrates a LTE/LTE-A system, according to a prior art.

Accordingly the embodiments herein provide a method for transmitting downlink control information to a User Equipment (UE) in a wireless communication system. The method includes segmenting a plurality of Aggregation Levels (ALs) across multiple bandwidth parts (BWPs) in a Physical Downlink Control Channel (PDCCH). Further, the method includes transmitting the plurality of segmented aggregation levels across multiple BWPs to one or more UEs. The segmented plurality of ALs includes multiple combinations of ALS across multiple BWPs.

Accordingly the embodiments herein provide a method for transmitting downlink control information to a User Equipment (UE) in a wireless communication system. The method includes segmenting a length of downlink control information (DCI) across multiple bandwidth parts (BWPs) in a PDCCH. Further, the method includes transmitting the segmented DCI across multiple BWPs to one or more UEs.

Accordingly the embodiments herein provide a base station for transmitting downlink control information to a User Equipment (UE) in a wireless communication system. The base station includes a control information indicator configured to segment a plurality of Aggregation Levels (ALs) across multiple bandwidth parts (BWPs) in a Physical Downlink Control Channel (PDCCH). Further, the control information indicator is configured to transmit the plurality of segmented aggregation levels across multiple BWPs to one or more UEs. The segmented plurality of ALs includes multiple combinations of ALs across multiple BWPs.

Accordingly the embodiments herein provide a base station for transmitting downlink control information to a User Equipment (UE) in a wireless communication system. The base station includes a control information indicator configured to segment a length of downlink control information (DCI) across multiple bandwidth parts (BWPs) in a Physical Downlink Control Channel (PDCCH). Further, the control information indicator is configured to transmit the segmented DCI across multiple BWPs to one or more UEs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly the embodiments herein provide a method for transmitting downlink control information to a User Equipment (UE) in a wireless communication system. The method includes segmenting a plurality of Aggregation Levels (ALs) across multiple bandwidth parts (BWPs) in a Physical Downlink Control Channel (PDCCH). Further, the method includes transmitting the plurality of segmented aggregation levels across multiple BWPs to one or more UEs. The segmented plurality of ALs includes multiple combinations of ALs across multiple BWPs.

The different types of multiple BWPs include one of non-contiguous BWPs, contiguous BWPs and overlapping BWPs.

In an embodiment, the location of the plurality of ALs across multiple BWPs can be static or semi-static. In some embodiments, the location of the plurality of ALs across multiple BWPs can be configured dynamically. Namely, the location of the plurality of ALs across multiple BWPs can be static, semi-static, or configured dynamically.

In various embodiments, the method includes receiving Channel Quality Index (CQI) reports from the one or more UEs. The one or more UEs are categorized as a group based on the CQI reported by the one or more UEs. The AL on a single BWP is transmitted to one or more UEs in the group through a group PDCCH message.

In some embodiments, the method includes segmenting a length of downlink control information (DCI) across multiple BWPs in a PDCCH. The segmented DCI across multiple BWPs is transmitted to the one or more UEs. The location of the DCI on the one or more BWPs among the plurality of BWPs is indicated to the UE in one BWP.

In an embodiment, the location of the DCI can be static or semi-static across the multiple BWPs. In some embodiments, the location of the DCI across the multiple BWPs is configured dynamically. Namely, the location of the DCI across multiple BWPs can be static, semi-static, or configured dynamically.

Accordingly the embodiments herein provide a base station for transmitting downlink control information to a User Equipment (UE) in a wireless communication system. The base station includes a control information indicator configured to segment a plurality of Aggregation Levels (ALs) across multiple bandwidth parts (BWPs) in a Physical Downlink Control Channel (PDCCH). Further, the control information indicator is configured to transmit the plurality of segmented aggregation levels across multiple BWPs to one or more UEs. The segmented plurality of ALs includes multiple combinations of ALS across multiple BWPs.

In an embodiment, the multiple bandwidth parts comprise one of contiguous bandwidth parts, non-contiguous bandwidth parts and overlapping bandwidth parts.

In an embodiment, the control information indicator can be configured to indicate a location of the plurality of ALs across multiple BWPs to the UE in one BWP.

In an embodiment, the location of the plurality of ALs across multiple BWPs is static.

In an embodiment, the location of the plurality of ALs across multiple BWPs is semi-static.

In an embodiment, the location of the plurality of ALs across multiple BWPs is configured dynamically.

In an embodiment, the location of ALs on consecutive BWPs is identified based on decoding of the PDCCH at the UE.

In an embodiment, the control information indicator can be configured to transmit at least one AL on a single BWP to one or more UEs in a group.

In an embodiment, the location of the PDCCH on other BWPs is identified based on the at least one AL on the single BWP.

In an embodiment, the one or more UEs are categorized as a group based on Channel Quality information (CQI) reported by the one or more UEs.

In an embodiment, the control information indicator can be configured to transmit at least one AL on the single BWP to the one or more UEs in the group through a group common PDCCH message.

Accordingly the embodiments herein provide a base station for transmitting downlink control information to a User Equipment (UE) in a wireless communication system. The base station includes a control information indicator configured to segment a length of downlink control information (DCI) across multiple bandwidth parts (BWPs) in a Physical Downlink Control Channel (PDCCH). Further, the control information indicator is configured to transmit the segmented DCI across multiple BWPs to one or more UEs.

In an embodiment, the multiple bandwidth parts comprises one of contiguous bandwidth parts, non-contiguous bandwidth parts and overlapping bandwidth parts.

In an embodiment, the control information indicator can be configured to indicate a location of DCI across multiple BWPs is indicated to the UE in one BWP.

In an embodiment, the location of the DCI is static across the multiple BWPs.

In an embodiment, the location of the DCI is semi-static across the multiple BWPs.

In an embodiment, the location of the DCI across the multiple BWPs is configured dynamically.

The proposed method and system can be used for reducing the blind decoding attempts of the PDCCH by the UE. The proposed method enables the UE to narrow down the search space (implicitly) and in turn reduce blind decoding attempts at the UE. In addition, the segmenting/splitting the AL resources helps in improving the scheduling capacity i.e., increasing the amount of resources available in the control channel to accommodate a larger number of UEs.

Further, with signaling of the Aggregation Level (AL) to the UE, the UE exactly identifies which part of the control channel resources it has to perform a blind decoding attempt in. Thus, the proposed method enables the UE to further narrow down the search space on a higher level of granularity as compared to the solution described above.

With the proposed method, the contents of the control information format are across the multiple active BWPs. Hence, with this method, the length of the control information format is modified to reduce the blind decoding attempts at the UE.

Referring now to the drawings, and more particularly to FIGS. 3 through 11b, where similar reference characters denote corresponding features consistently throughout the figures, there are shown preferred embodiments.

Figure 3:
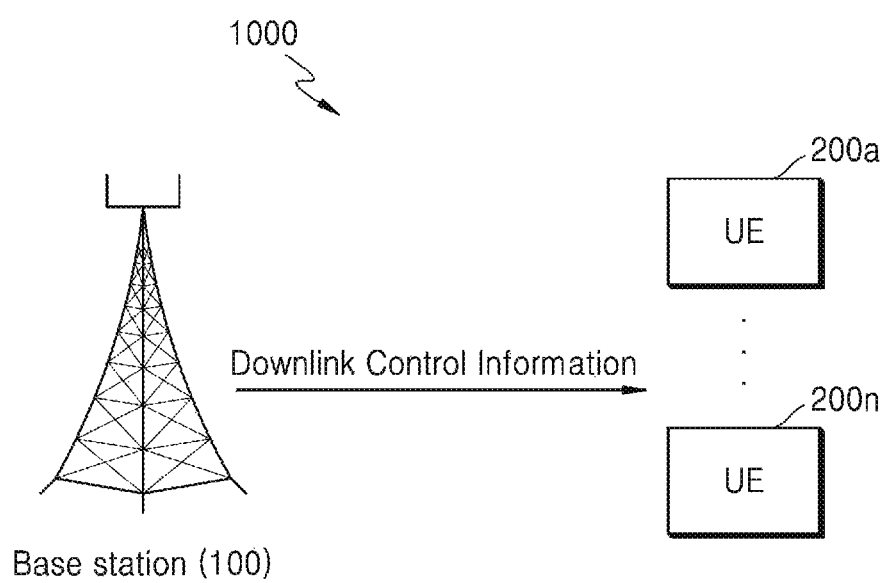
FIG. 3 illustrates an example wireless communication system in which a base station transmits a downlink control information to a User Equipment (UE), according to an embodiment as disclosed herein.

FIG. 3 illustrates an example wireless communication system 1000 in which a base station 100 transmits a downlink control information to a User Equipment (UE), according to an embodiment as disclosed herein. As depicted in the FIG. 3, the wireless communication system 1000 includes a base station 100 and a plurality of UEs 200a-200n. The plurality of UEs 200a-200n receive signals from the base station 100 on one or more downlink (DL) channels, and transmit signals to the base station 100 on one or more uplink (UL) channels.

For illustrative purposes, several embodiments will be described in the context of 5G base station, also referred to as gNB. It should be understood that the problems and solutions described herein are equally applicable to other wireless access networks and user equipment (UEs) implementing other access technologies and standards.

The base station 100 transmits the downlink control information to the UEs 200a-200n as shown in the FIG. 3. The method for transmitting the downlink control information to the UEs 200a-200n are described in conjunction with the figures in the later parts of the description.

Figure 4A:
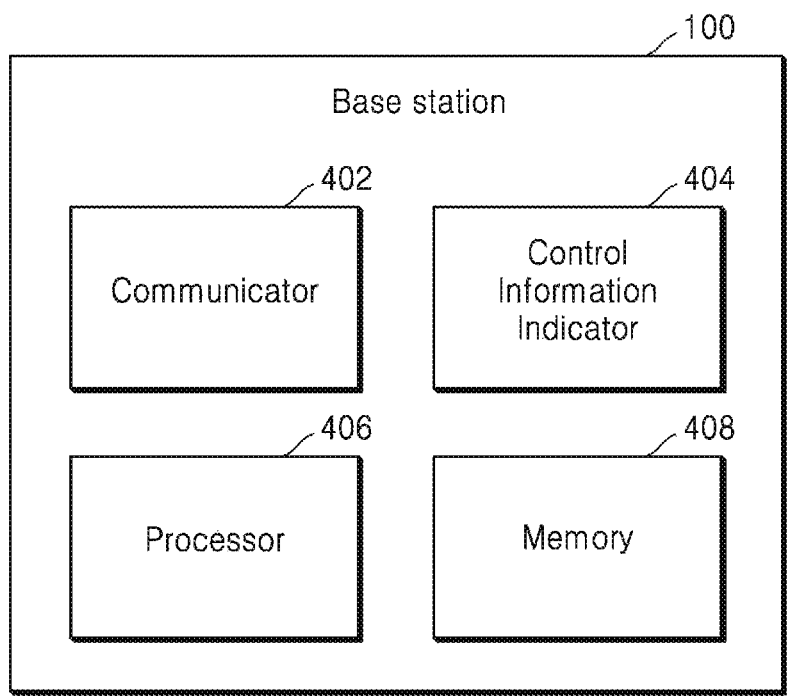
FIG. 4A is a block diagram illustrating various components of the base station, according to an embodiment as disclosed herein.

FIG. 4A is a block diagram illustrating various components of the base station 100, according to an embodiment as disclosed herein. As depicted in the FIG. 4A, the base station 100 includes a communicator 402, a control information indicator 404, a processor 406 and a memory 408.

In an embodiment, the communicator 402 can be configured to communicate one or more signaling messages to the UEs 200a-200n. The communicator 402 includes a RF transceiver module (or dual RF modules), coupled with antenna, and transmits RF signals from the antenna.

The control information indicator 404 can be configured to transmit the downlink control information to the UEs 200a-200n. In an embodiment, the control information indicator 404 can be configured to segment the plurality of ALs across multiple bandwidth parts (BWPs) in the PDCCH.

Further, the control information indicator 404 can be configured to transmit the plurality of segmented aggregation levels across multiple BWPs to the UEs 200a-200n. The segmented plurality of ALs includes multiple combinations of ALs across multiple BWPs.

In another embodiment, the control information indicator 404 can be configured to transmit at least one AL on a single BWP to the UEs 200a-200n in a group through a group common PDCCH message.

In some embodiments, the control information indicator 404 can be configured to transmit the segmented DCI across multiple BWPs to the UEs 200a-200n.

The processor 406 depicts a computing environment in the base station 100 for implementing method for transmitting the downlink control information to the UEs in the wireless communication system 1000. The computing environment comprises at least one processing unit that is equipped with a control unit and an Arithmetic Logic Unit (ALU), a clock chip, a plurality of networking devices, and a plurality of Input output (I/O) devices. The processor 406 is responsible for processing the instructions of the technique. The processor 406 receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators. The processing unit is responsible for processing the instructions of the technique. The technique comprising of instructions and codes required for the implementation are stored in either the memory 408 or the storage or both. At the time of execution, the instructions may be fetched from the corresponding memory 408 or storage unit, and executed by the processing unit. The processing unit synchronizes the operations and executes the instructions based on the timing signals generated by the clock chip. The embodiments of the present disclosure disclosed herein can be implemented through at least one software program running on at least one hardware device and performing network management functions to control the elements. Further, the memory 408 is also configured to store information related to UE operation.

In an embodiment, the processor 406 can be configured to comprise the control information indicator 404. In an embodiment, the processor 406 can be configured to perform operations performed by the control information indicator 404 described above.

Figure 4B:
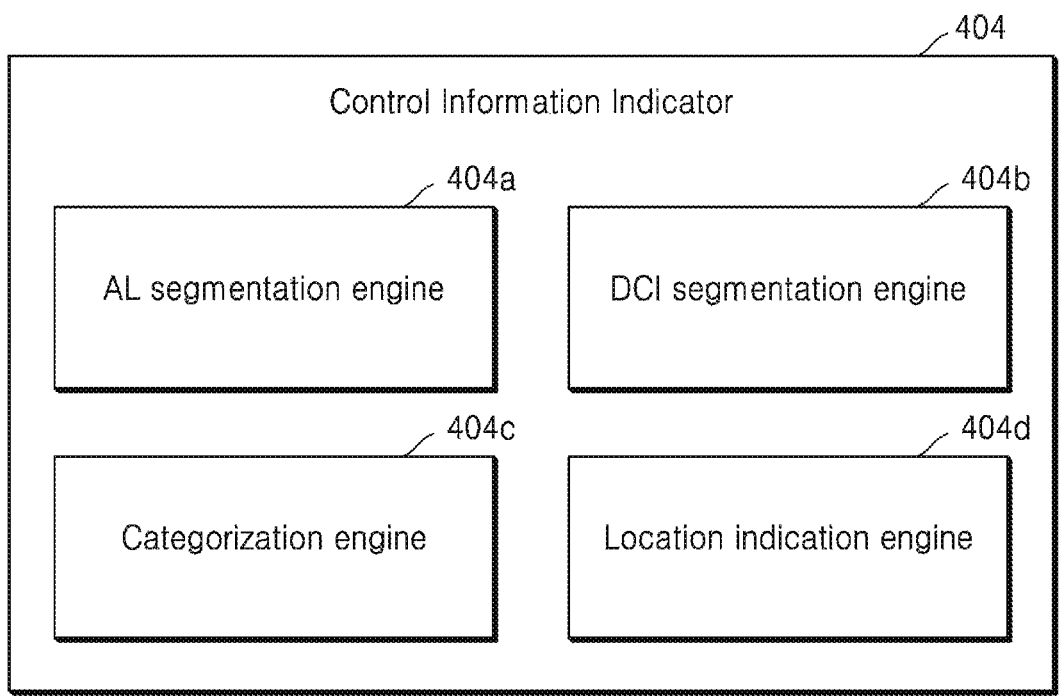
FIG. 4B illustrates various components of a control information indicator in the base station, according to an embodiment as disclosed herein.

FIG. 4B illustrates various components of the control information indicator 404 in the base station 100, according to an embodiment as disclosed herein. As depicted in the FIG. 4B, the control information indicator 404 includes an AL segmentation engine 404a, a DCI segmentation engine 404b, a categorization engine 404c and a location indication engine 404d.

In an embodiment, the AL segmentation engine 404a can be configured to segment a plurality of AL resources across multiple BWPs in the PDCCH. The multiple bandwidth parts include one of contiguous bandwidth parts, non-contiguous bandwidth parts and overlapping bandwidth parts. With the segmentation of AL resources across multiple BWPs, number of blind decoding attempts required to decode the NR-PDCCH at the UE is reduced by narrowing the search space of the UE. The segmented plurality of ALs includes multiple combinations of ALs across multiple BWPs.

In an embodiment, the DCI segmentation engine 404b can be configured to segment the length of DCI across multiple (BWPs) in the PDCCH. With modifying the lengths of the control channel information formats, the number of blind decoding attempts at the UE can be reduced.

In an embodiment, the categorization engine 404c can be configured to categorize the plurality of UEs 200a-200n based on CQI reports received from the plurality of UEs 200a-200n. For example, the categorization engine 406c can be configured to categorize the UEs 200a-200d in a first group based on the CQI reports received from the UEs 200a-200d. In another example, the categorization engine 406c can be configured to categorize the UEs 200e-200g in a second group based on the CQI reports. Thus, the categorization engine 404c can be configured to categorize the UEs in groups using the CQI reports of the UEs.

In an embodiment, the location indication engine 404d can be configured to indicate the location of the plurality of ALs across multiple BWPs. The location of the ALs across multiple BWPs can be static (i.e., there is a fixed relationship between control channel information resources).

In another embodiment, the location of the ALs across multiple BWPs can be semi-static. In some embodiments, the location of the ALs across multiple BWPs can be configured dynamically by the location indication engine 404d.

In some embodiments, the location indication engine 404d can be configured to indicate a location of DCI across multiple BWPs to the UEs in one BWP.

In an embodiment, the location of the DCI can be static. In another embodiment, the location of the DCI can be semi-static. In yet another embodiment, the location of the DCI across the multiple BWPs is configured dynamically.

Figure 5:
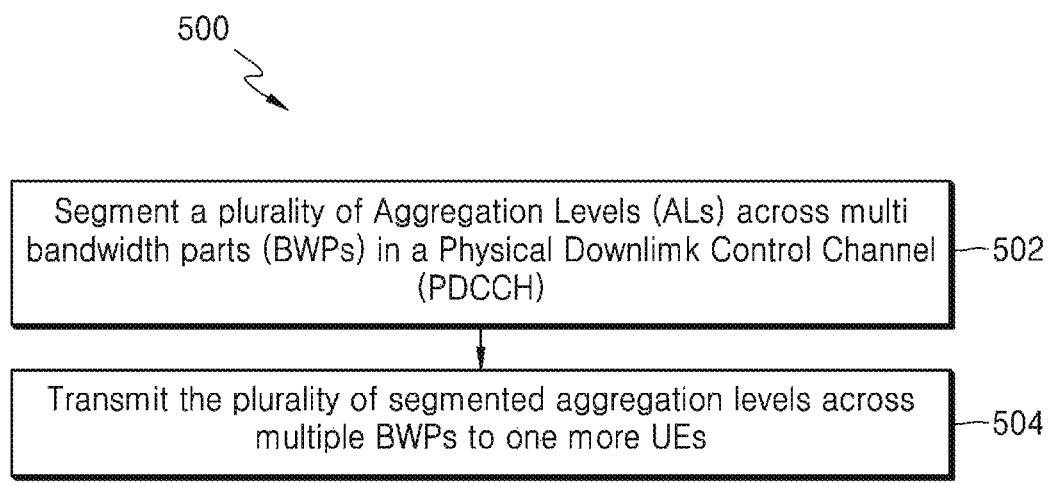
FIG. 5 is a flow chart illustrating a method for transmitting downlink control information to the UE in the wireless communication system, according to an embodiment as disclosed herein.

FIG. 5 is a flow chart 500 illustrating a method for transmitting downlink control information to the UE in the wireless communication system, according to an embodiment as disclosed herein. At step 502, the method includes segmenting the plurality of ALs across multiple BWPs in the PDCCH. The method allows the control information indicator 404 to segment the plurality of across multiple BWPs in the PDCCH.

At step 504, the method includes transmitting the plurality of segmented ALs across multiple BWPs to the one or more UEs 200a-200n. The method allows the control information indicator 404 to transmit the plurality of segmented ALs across multiple BWPs to the one or more UEs 200a-200n. The segmented plurality of ALs includes multiple combinations of ALs across multiple BWPs. The various types of multiple BWPs include one of non-contiguous BWPs, contiguous BWPs and overlapping BWPs.

With the proposed method, the number of blind decoding attempts required to decode the NR-PDCCH is reduced by implicitly narrowing the UE search space, which improves energy efficiency at the UE.

The various actions, acts, blocks, steps, or the like in the flow chart 500 may be performed in the order presented, in a different order or simultaneously. Further, in some embodiments, some of the actions, acts, blocks, steps, or the like may be omitted, added, modified, skipped, or the like without departing from the scope of the invention.

FIG. 6A shows splitting the Aggregation Level (AL) resources across the multiple active bandwidth parts (BWPs), according to the embodiments as disclosed herein. The splitting/segmenting of AL resources across non-contiguous BWPs and contiguous BWPs are shown in the FIG. 6A.

Figure 6B:
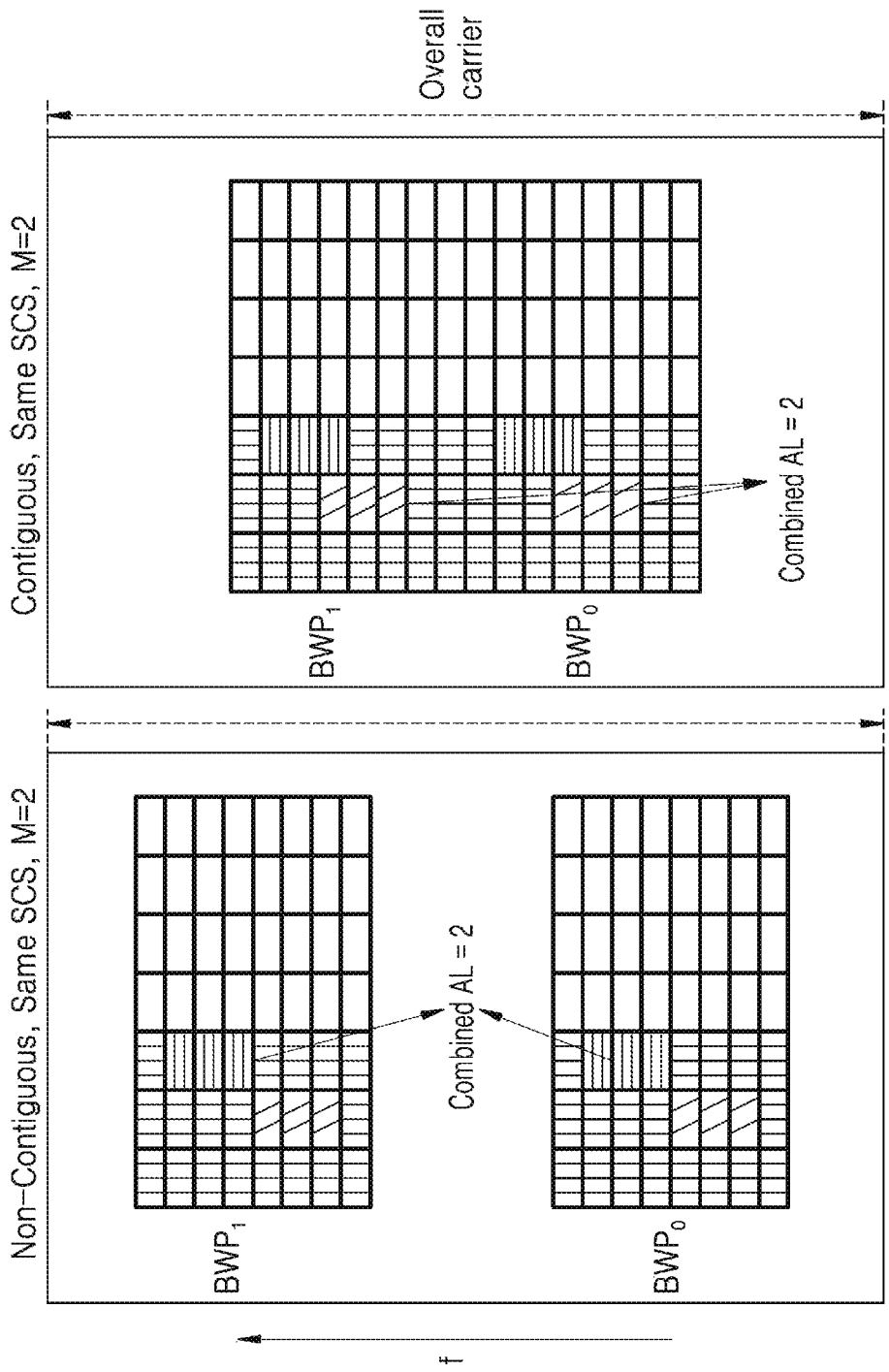
FIG. 6B shows another illustration for splitting the AL resources across the multiple active bandwidth parts (BWPs), according to the embodiments as disclosed herein.

FIG. 6B shows another illustration for splitting the AL resources across the multiple active BWPs, according to the embodiments as disclosed herein. The splitting/segmenting of AL resources across non-contiguous BWPs and contiguous BWPs are shown in the FIG. 6B.

Figure 6C:
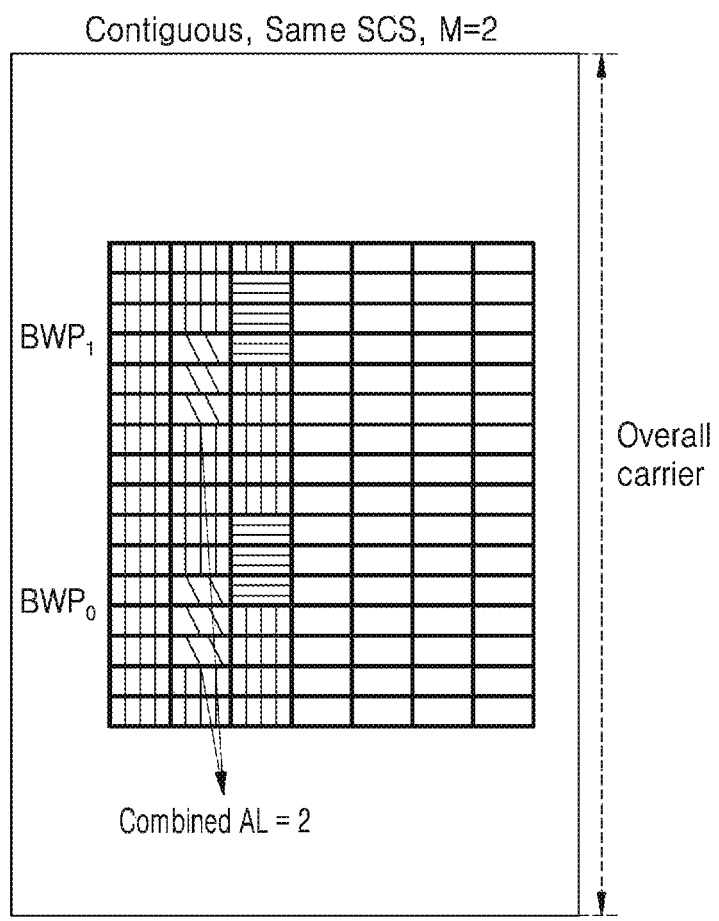
FIG. 6C shows another illustration for Splitting the Aggregation Level (AL) Resources across the Multiple Active BWPs, according to the embodiments as disclosed herein.

FIG. 6C shows another illustration for splitting the AL resources across the multiple active BWPs, according to the embodiments as disclosed herein. The splitting/segmenting of AL resources across the contiguous BWPs are shown in the FIG. 6C.

In the FIGS. 6A-6C the UE 200 is configured with two active BWPs (M=2) with AL=2. Consider that the UE 200 is assigned to monitor more than one active BWP (i.e., BWP0 and BWP1) and is assigned an AL of 2. The resources for different levels of aggregation in the different BWPs are distinct as shown in the FIGS. 6a-6c. The search space (i.e., set of resources) may or may not be common across the multiple BWPs. In the FIGS. 6a-6c, the non-contiguous BWPs (i.e., BWP0 and BWP1) and the contiguous BWPs namely BWP0 and BWP1 are shown.

When the UE 200 is assigned with an AL of 2 the resources required for the control information can be split up as AL of 1 on BWP0 and AL of 1 on BWP1. The combination of resources assigned for AL 1 in BWP0 and AL 1 in BWP1 cumulatively results in an AL of 2. The same is applicable for other ALs (i.e., AL 4, AL 8 and so on).

Thus, with the proposed method, the number of blind decoding attempts required to decode the NR-PDCCH is reduced by implicitly narrowing the UE search space. The table 2 shows reduction in blind decoding attempts of the UE 200.

TABLE 2

| AL | Legacy (Re1-8) blind decoding attempts (PDCCH candidates after each AL) | Splitting AL blind decoding attempts (PDCCH candidates after each AL) | Reduction in blind decoding attempts |
|---|---|---|---|
| 1 | 6 * 2 = 12 | 6 * 2 = 12 | — |
| 2 | 12 * 2 = 24 | 6 * 2 = 12 | 12 (50%) |
| 4 | 14 * 2 = 28 | 12 * 2 = 24 | 4 (14%) |
| 8 | 16 * 2 = 32 | 14 * 2 = 28 | 4 (12.5%) |

In an embodiment, the indication to the UE 200 that the AL resources are segmented can be indicated through a Medium Access Control (MAC) Control Element (CE).

The UE 200 can determine the location of the AL on the other BWP by performing a blind decoding on both the BWPs.

In some embodiment, the UE may perform a blind decoding on one of the BWPs and find the location of the other AL in the other BWP based on a fixed relationship (time/frequency) between the resources of the ALs on the different BWPs.

In another embodiment, the base station 100 indicates the location of the AL on a next BWP through an indication in the PDCCH decoded on the first BWP. This is an implicit indication of the search space as by virtue of decoding one AL the location of the other AL can be determined at the UE.

With the proposed method, there is no additional signaling required on the physical layer. The proposed method can be used to improve scheduling capacity by efficient resource utilization for transmission of control channel information.

Figure 7:
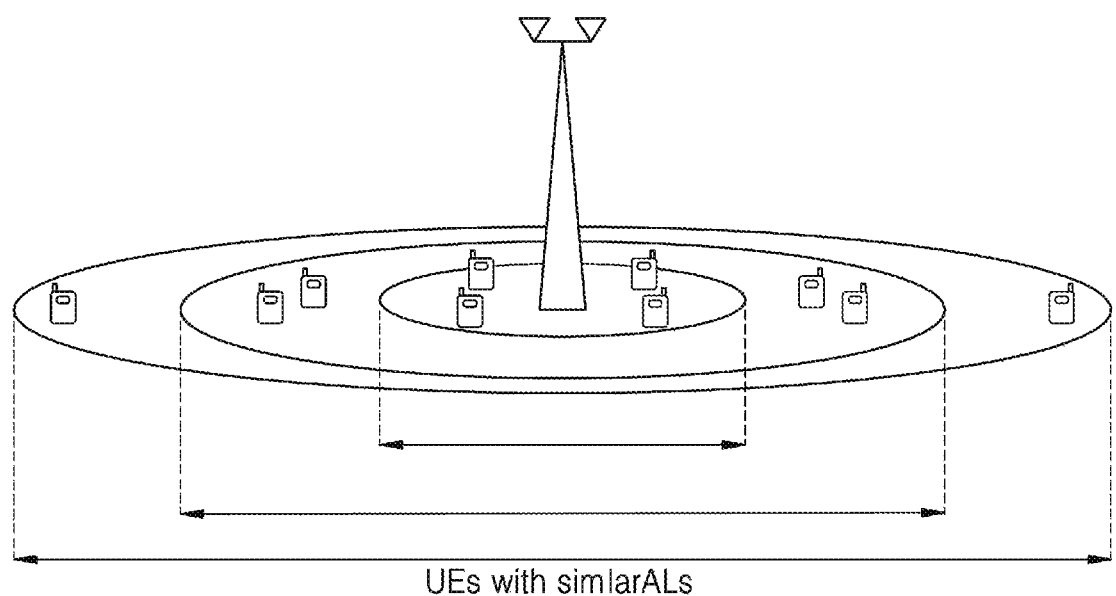
FIG. 7 is an example illustration in which the base station categorizes one or more UEs in a group for transmitting ALs to the one or more UEs, according to an embodiment as disclosed herein.

FIG. 7 is an example illustration in which the base station 100 categorizes one or more UEs in a group for transmitting ALs to the one or more UEs, according to an embodiment as disclosed herein.

As depicted in the FIG. 7, the base station 100 receives the CQI reports from the UEs 200a-200n. Further, the base station categorizes the UEs 200a-200n into groups based on the CQI reports received from the UEs 200a-200n.

In an embodiment, the base station 100 transmits same ALs on a single BWP to the UEs in a group through the group common PDCCH message. The location of the PDCCH on other BWPs is identified based on the ALs on the single BWP at the UE 200.

With the proposed method, the AL is determined based on the channel quality of the UE 200 as reported in LTE/LTE-A with the CQI. The UEs with similar CQI level are grouped together, having the same AL.

Figure 8:
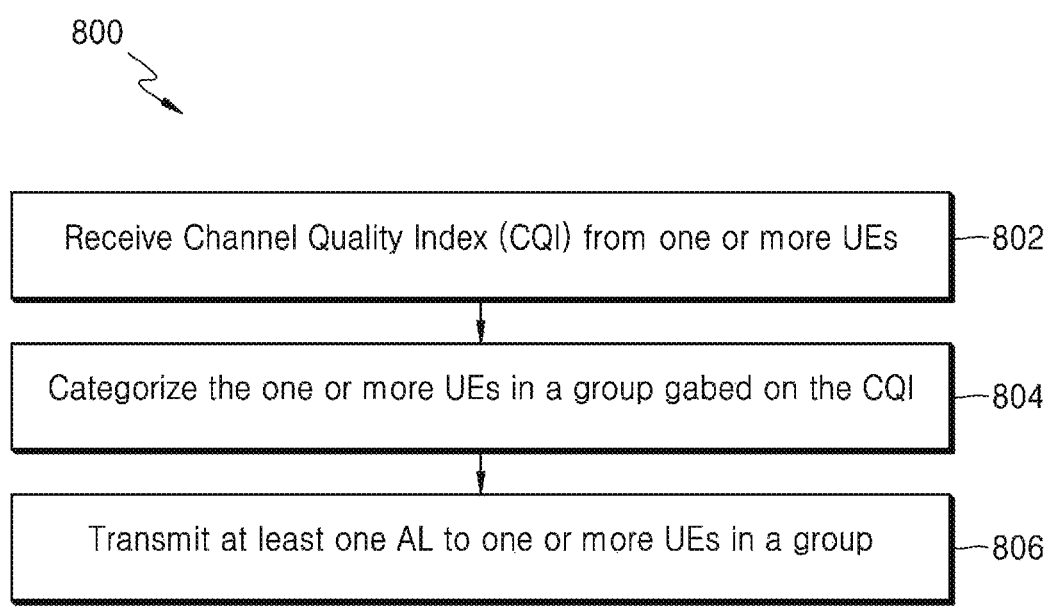
FIG. 8 is a flow chart illustrating a method for transmitting downlink control information to the UE in the wireless communication system, according to an embodiment as disclosed herein.

FIG. 8 is a flow chart 800 illustrating a method for transmitting downlink control information to the UE in the wireless communication system, according to an embodiment as disclosed herein.

At step 802, the method includes receiving the CQI from the UEs 200a-200n. The method allows the categorization engine 404c to receive the CQI from the UEs 200a-200n.

At step 804, the method includes categorizing the one or more UEs in a group based on the CQI. The method allows the categorization engine 404c to categorize the one or more UEs in a group based on the CQI.

At step 806, the method includes transmitting at least one AL to one or more UEs in the group. The method allows the control information indicator 404 to transmit at least one AL to the one or more UEs in the group.

The various actions, acts, blocks, steps, or the like in the flow chart 800 may be performed in the order presented, in a different order or simultaneously. Further, in some embodiments, some of the actions, acts, blocks, steps, or the like may be omitted, added, modified, skipped, or the like without departing from the scope of the invention.

Figure 9A:
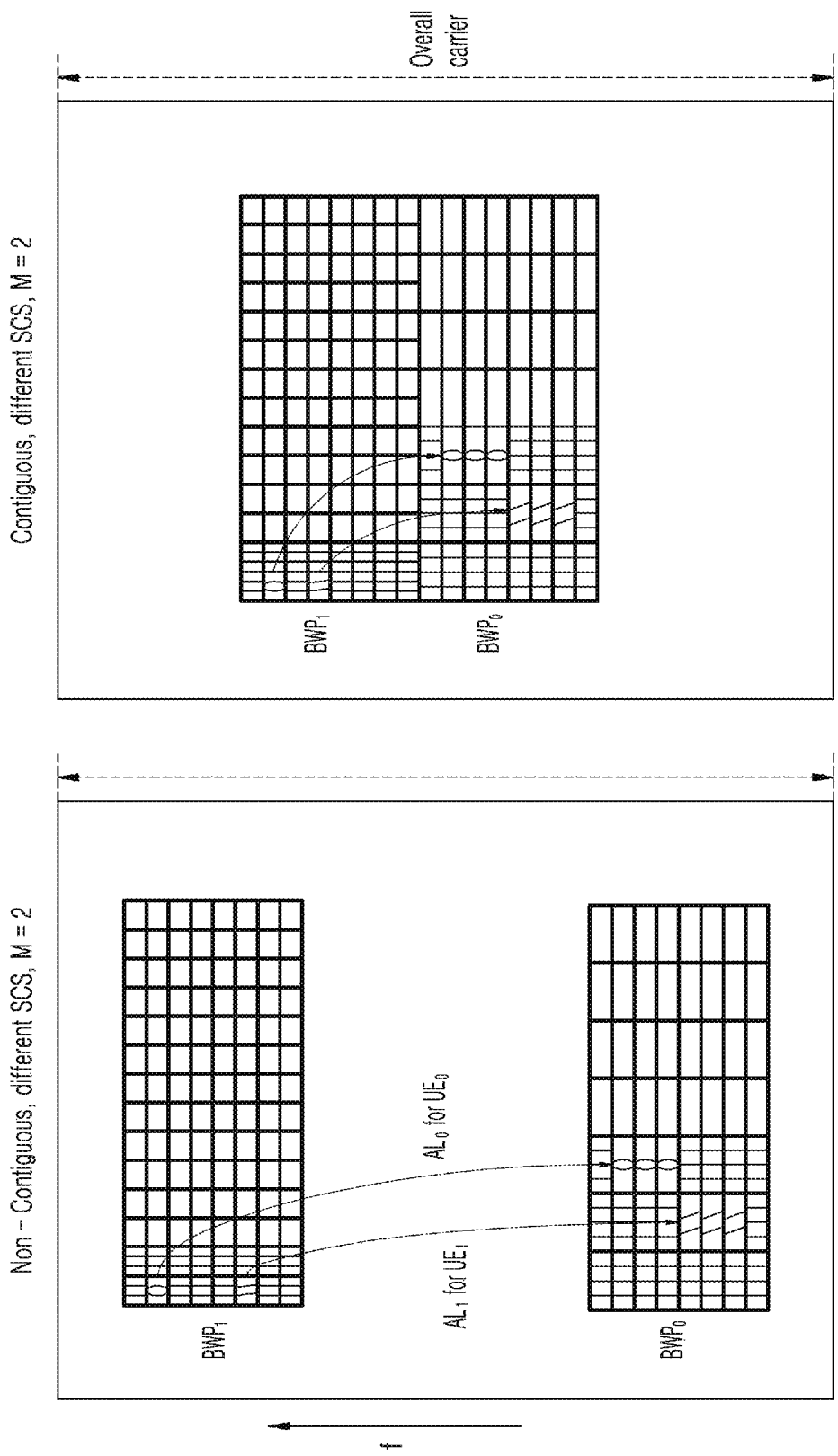
FIG. 9A illustrates signaling the aggregation level, according to an embodiment as disclosed herein.
Figure 9B:
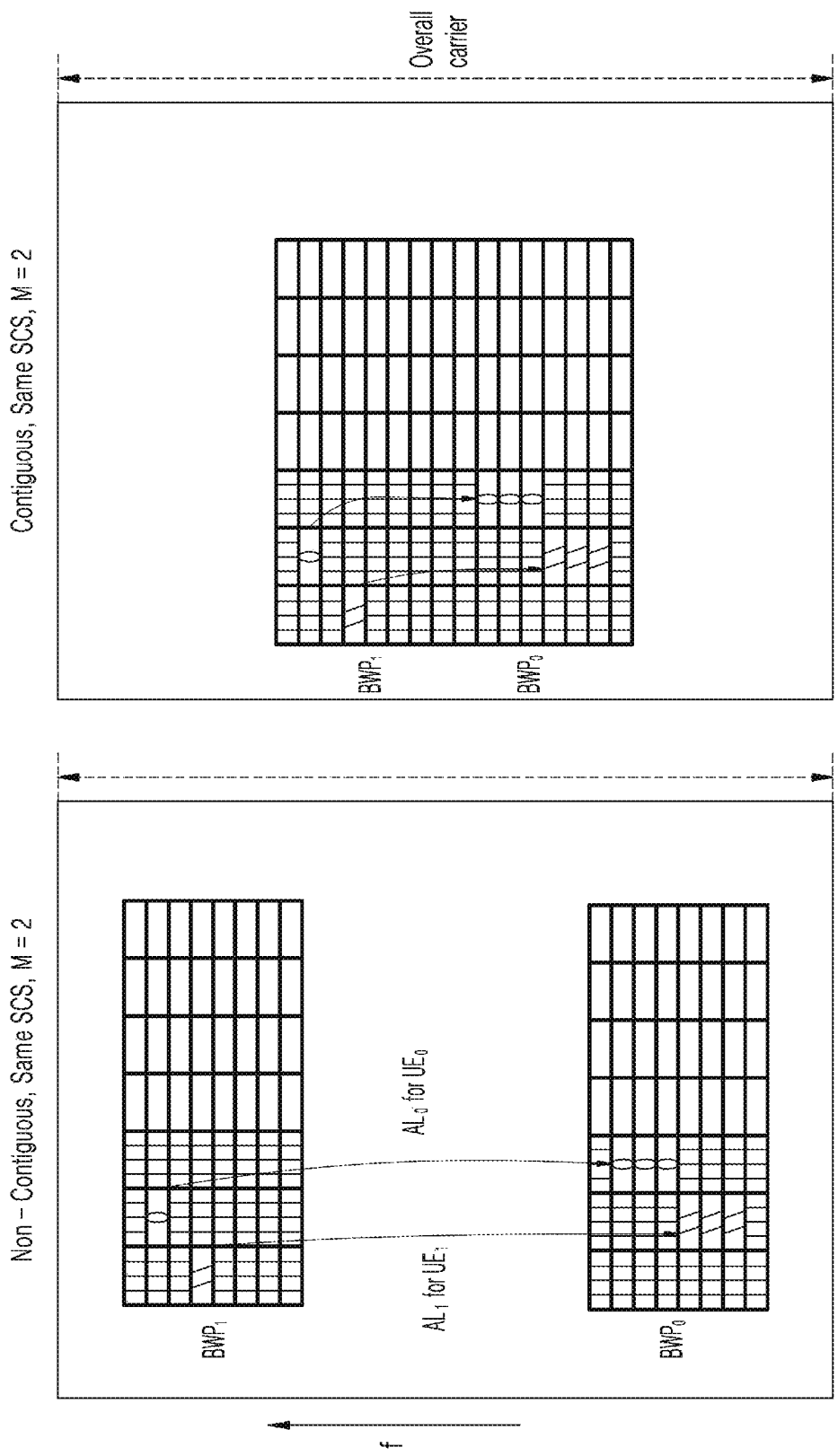
FIG. 9B shows another illustration for signaling the aggregation level, according to an embodiment as disclosed herein.

FIG. 9A illustrates signaling the aggregation level, according to an embodiment as disclosed herein;

FIG. 9B shows another illustration for signaling the aggregation level, according to an embodiment as disclosed herein;

In the FIGS. 9A-9B, the non-contiguous BWPs (i.e., BWP0 and BWP1) and the contiguous BWPs namely BWP0 and BWP1 are shown.

In the proposed method, the base station 100 transmits the AL associated with each UE on one BWP, using which the UE determines the location of the PDCCH on the other BWPs. As the base station 100 transmits an explicit indication of the AL, the search space of the UE is narrowed to the location associated with the AL which in turn leads to a reduction in the number of blind decoding attempts. The table 3 shows reduction in blind decoding attempts.

TABLE 3

| AL | Legacy (Rel-8) blind decoding attempts (PDCCH candidates after each AL) | Splitting AL blind decoding attempts (PDCCH candidates after each AL) | Reduction in blind decoding attempts |
|---|---|---|---|
| 1 | 6 * 2 = 12 | 6 * 2 = 12 | — |
| 2 | 12 * 2 = 24 | 6 * 2 = 12 | 12 (50%) |
| 4 | 14 * 2 = 8 | 2 * 2 = 4 | 24 (85%) |
| 8 | 16 * 2 = 32 | 2 * 2 = 4 | 28 (87.5%) |

Thus, the proposed method of signaling the ALs to the UE 200 reduces blind decoding attempts at the UE and also reduces control information overhead (as only a few bits are used to represent the AL).

It should be noted that the AL is determined based on the channel quality of the UE as reported in LTE/LTE-A with the CQI. The, multicasting of the ALs to the UEs can be facilitated easily through the group common PDCCH.

Figure 10:
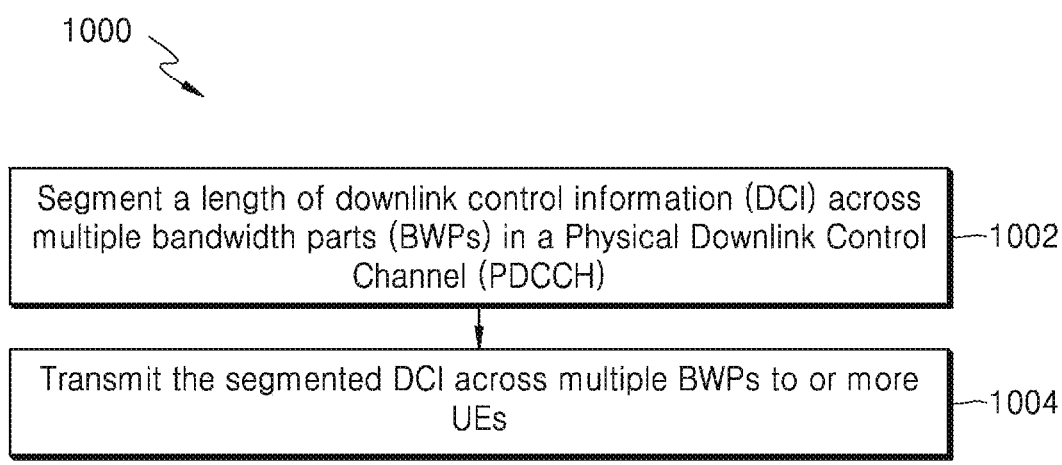
FIG. 10 is a flow chart illustrating a method for transmitting a segmented downlink control information to the UE in the wireless communication system, according to an embodiment as disclosed herein.

FIG. 10 is a flow chart 1000 illustrating a method for transmitting the segmented downlink control information to the UE in the wireless communication system, according to an embodiment as disclosed herein. At step 1002, the method includes segmenting the length of DCI across multiple BWPs in the PDCCH. The method allows the segmentation engine 404a to segment the length of the DCI across multiple BWPs in the PDCCH. In an example, the DCI is segmented as 6 bits.

At step 1004, the method includes transmitting the segmented DCI across the multiple BWPs to one or more UEs 200a-200n. The method allows the control information indicator 404 to transmit the segmented DCI across multiple BWPs to one or more UEs 200a-200n.

The various actions, acts, blocks, steps, or the like in the flow chart 1000 may be performed in the order presented, in a different order or simultaneously. Further, in some embodiments, some of the actions, acts, blocks, steps, or the like may be omitted, added, modified, skipped, or the like without departing from the scope of the invention.

With the proposed method, the control information is segmented into bits and the segmented control information is transmitted across the multiple BWPs to one or more UEs 200a-200n. The UE 200 needs to perform only 1 or 2 blind decoding attempts for all the combinations.

Unlike the LTE/LTE-A systems in which the DCIs are differentiated based on length i.e., each of the DCIs have a different length which leads to a large number of blind decoding attempts because the UE has to attempt to decode all the possible DCI lengths, with the proposed method, the contents or length of the control information format (DCI/UCI) is segmented across the different BWPs for which the UE 200 needs to perform only 1 or 2 blind decoding attempts for all the combinations.

In an example, consider the DCI format 0/1A in LTE/LTE-A systems. Both of these systems have the same length but are differentiated based on a flag set in the DCI content. Similarly, Format 3/3A also has the same length but are differentiated based on the range of the RNTI used. Either of these techniques can be reused. The MAC CE is used to indicate to the UE about the segmentation/splitting across the BWPs.

In an embodiment, the location of the contents on the other BWP is determined based on a fixed relationship (time/frequency) of the resources between the different BWPs.

In another embodiment, a consequent location of the rest of the control channel formats is indicated to the UE 200 in a first BWP.

Figure 11A:
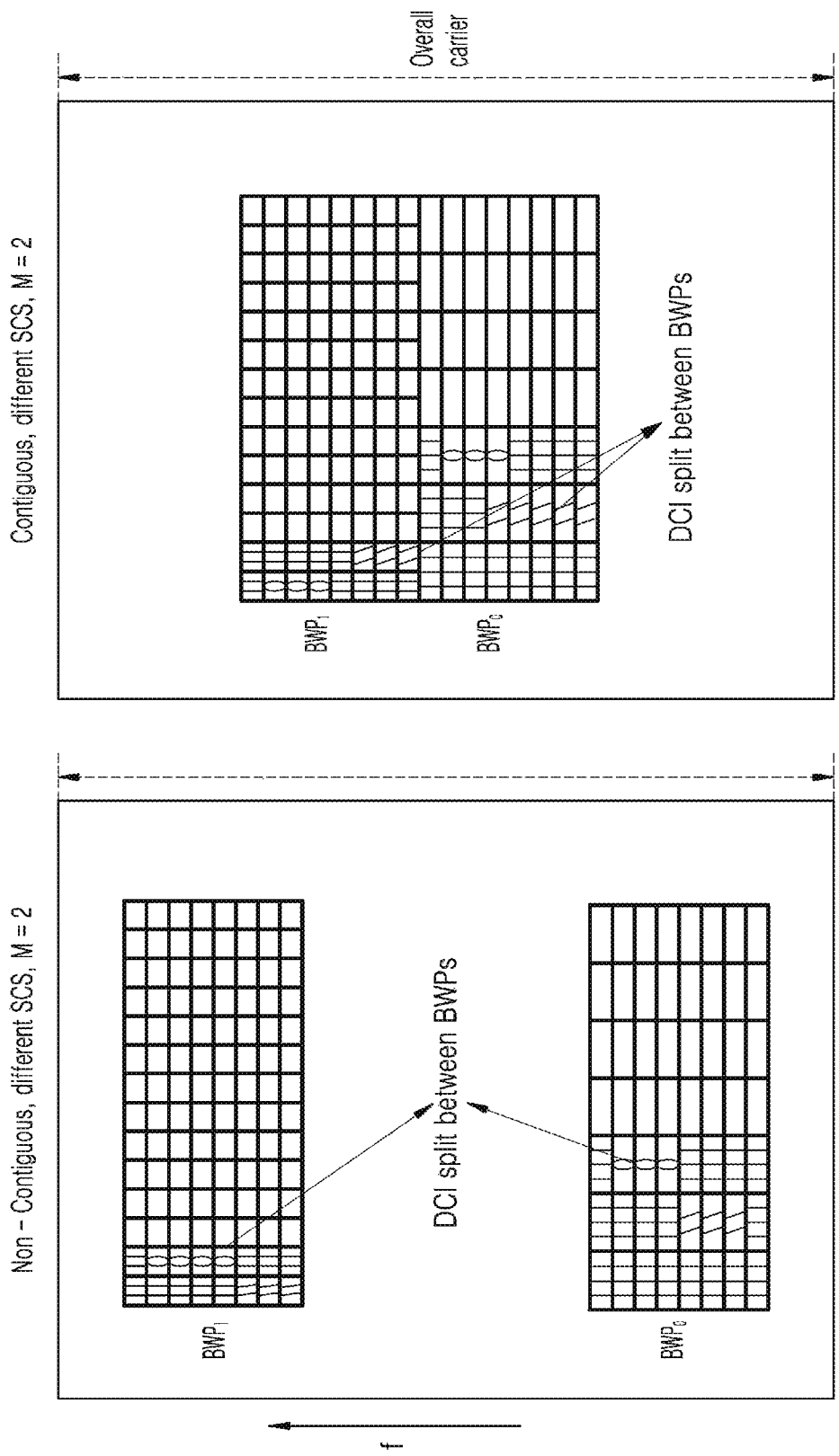
FIG. 11A illustrates splitting the contents of the Control Information Format across the multiple active BWPs, according to an embodiment as disclosed herein.

FIG. 11A illustrates splitting the contents of the Control Information Format across the multiple active BWPs, according to an embodiment as disclosed herein. The DCI is segmented across the two BWPs namely BWP0 and BWP1 for non-contiguous BWPs and the contiguous BWPs (i.e., BWP0 and BWP1) is shown in the FIG. 11A.

Figure 11B:
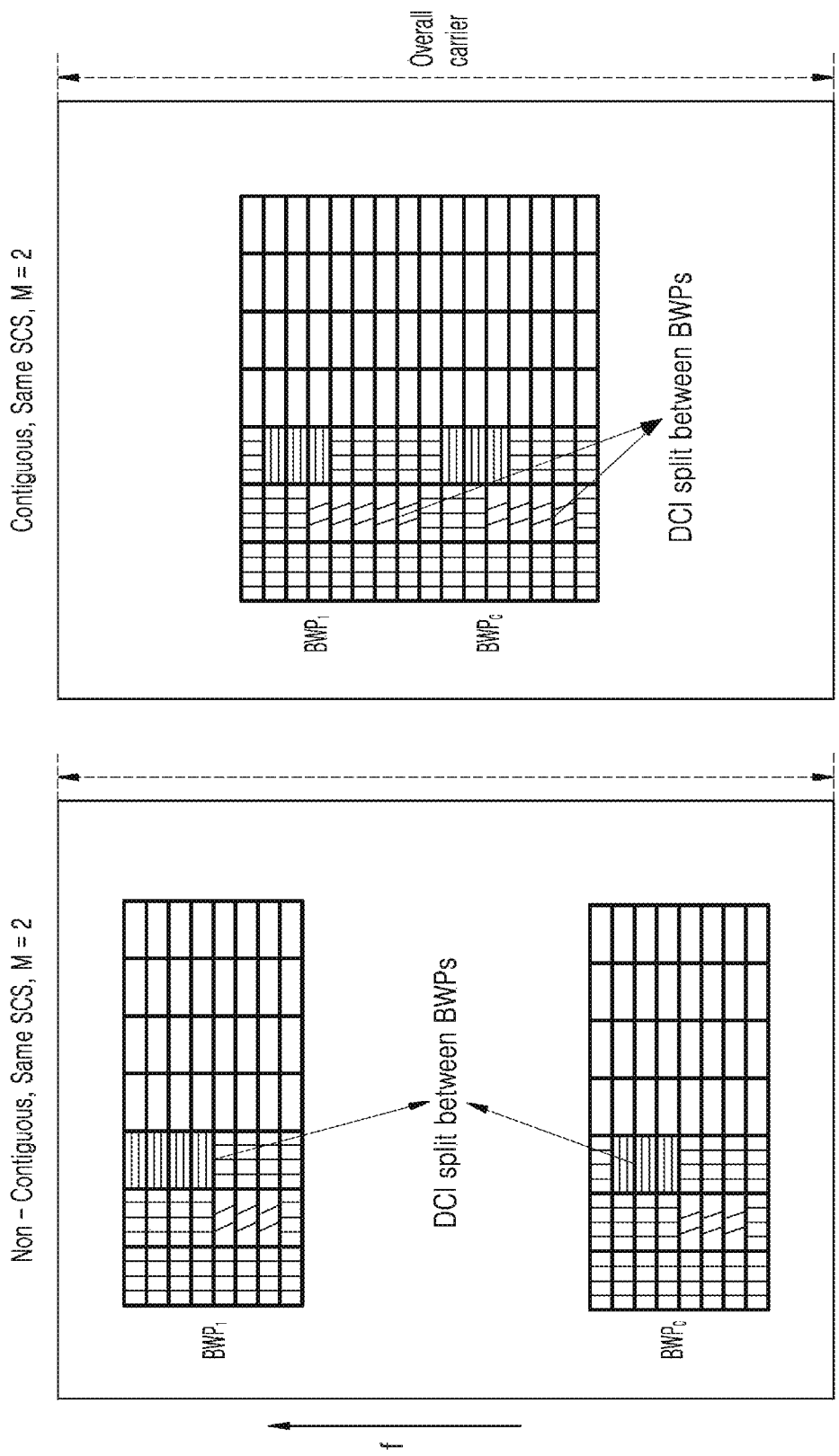
FIG. 11B shows another illustration for splitting the contents of the Control Information Format across the multiple active BWPs, according to an embodiment as disclosed herein.

FIG. 11B shows another illustration for splitting the contents of the Control Information Format across the multiple active BWPs, according to an embodiment as disclosed herein. The DCI is segmented across the two BWPs namely BWP0 and BWP1 for non-contiguous BWPs and the contiguous BWPs (i.e., BWP0 and BWP1) is shown in the FIG. 11B.

Figure 12:
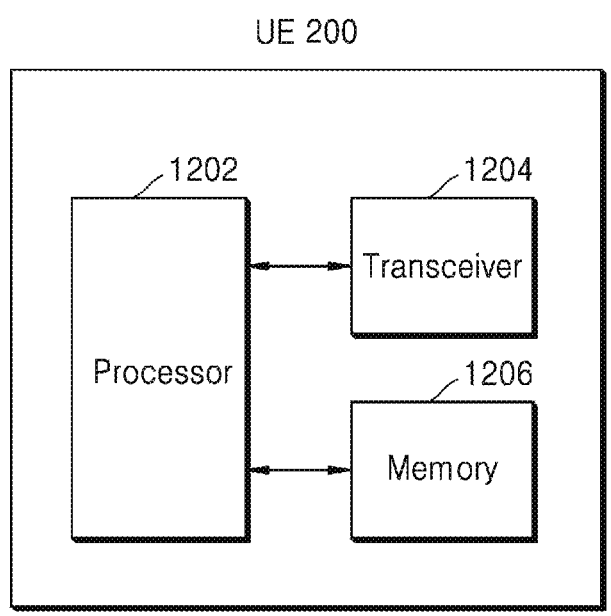
FIG. 12 illustrates a UE 200 according to another embodiment of the present disclosure.

FIG. 12 illustrates a UE 200 according to another embodiment of the present disclosure.

Referring to the FIG. 12, the UE 200 may include a processor 1202, a transceiver 1204 and a memory 1206. However, all of the illustrated components are not essential. The UE 200 may be implemented by more or less components than those illustrated in FIG. 12. In addition, the processor 1202 and the transceiver 1204 and the memory 1206 may be implemented as a single chip according to another embodiment.

The aforementioned components will now be described in detail.

The processor 1202 may include one or more processors or other processing devices that control the proposed function, process, and/or method. Operation of the UE 200 may be implemented by the processor 1202.

The processor 1202 may detect a PDCCH on a configured control resource set. The processor 1202 determines a method for dividing CBs and a method for rate matching of a PDSCH according to the PDCCH. The processor 1202 may control the transceiver 1204 to receive the PDSCH according to the PDCCH. The processor 1202 may generate HARQ-ACK information according to the PDSCH. The processor 1202 may control the transceiver 1204 to transmit the HARQ-ACK information.

The transceiver 1204 may include a RF transmitter for up-converting and amplifying a transmitted signal, and a RF receiver for down-converting a frequency of a received signal. However, according to another embodiment, the transceiver 1204 may be implemented by more or less components than those illustrated in components.

The transceiver 1204 may be connected to the processor 1202 and transmit and/or receive a signal. The signal may include control information and data. In addition, the transceiver 1204 may receive the signal through a wireless channel and output the signal to the processor 1202. The transceiver 1204 may transmit a signal output from the processor 1202 through the wireless channel.

The memory 1206 may store the control information or the data included in a signal obtained by the UE 200. The memory 1206 may be connected to the processor 1202 and store at least one instruction or a protocol or a parameter for the proposed function, process, and/or method. The memory 1206 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a base station in a wireless communication system, the method comprising:
    transmitting, to one or more user equipments (UEs), configuration information indicating that a plurality of resources corresponding to a first aggregation level (AL) are split into a plurality of sets of resources, wherein each of the plurality of sets of resources corresponds to a second AL lower than the first AL;
    splitting the plurality of resources into the plurality of sets of resources based on the configuration information; and
    transmitting, to the one or more UEs, downlink control information (DCI) on the plurality of sets of resources across multiple bandwidth parts (BWPs).

2. The method of claim 1, wherein the configuration information is transmitted via a medium access control (MAC) control element (CE).

3. The method of claim 1, wherein a blind decoding is performed on one of the multiple BWPs, which corresponds to one among the plurality of sets of resources.

4. The method of claim 3, wherein a location of each of the plurality of sets of resources across the multiple BWPs is static, semi-static, or configured dynamically.

5. The method of claim 3, wherein locations of the other one or more sets, among the plurality of sets of resources, are identified based on the blind decoding.

6. The method of claim 1, further comprising transmitting information indicating at least one AL on a single BWP to the one or more UEs in a group.

7. The method of claim 6, wherein a location of a physical downlink control channel (PDCCH) on other BWPs is identified based on the at least one AL on the single BWP.

8. The method of claim 6, wherein the one or more UEs are categorized as a group based on Channel Quality Information (CQI) reported by the one or more UEs.

9. The method of claim 6, wherein the information indicating the at least one AL is transmitted via a group common PDCCH message.

10. A method performed by a base station in a wireless communication system, the method comprising:
    transmitting, to one or more user equipments (UEs), configuration information indicating that contents of downlink control information (DCI) are segmented into a plurality of segments, wherein lengths of the plurality of segments are the same;
    segmenting the contents of the DCI into the plurality of segments based on the configuration information; and
    transmitting the DCI across multiple bandwidth parts (BWPs) to the one or more UEs.

11. The method of claim 10, wherein the configuration information is transmitted via a medium access control (MAC) control element (CE).

12. The method of claim 10, wherein a blind decoding is performed on a first segment with in a first BWP.

13. The method of claim 12, wherein locations of the other segments, among the plurality of segments, are identified by the blind decoding.

14. A base station in a wireless communication system, the base station comprising:
    a transceiver; and
    at least one processor configured to:
        transmit, to one or more user equipments (UEs) via the transceiver, configuration information indicating that a plurality of resources corresponding to a first aggregation level (AL) are split into a plurality of sets of resources, wherein each of the plurality of sets of resources corresponds to a second AL lower than the first AL,
        split the plurality of resources into the plurality of sets of resources based on the configuration information, and
        transmit, to the one or more UEs via the transceiver, downlink control information (DCI) on the plurality of sets of resources across multiple bandwidth parts (BWPs).

15. The base station of claim 14, wherein the configuration information is transmitted via a medium access control (MAC) control element (CE).

16. The base station of claim 14,
    wherein a blind decoding is performed on one of the multiple BWPs, which corresponds to one among the plurality of sets of resources, and wherein locations of the other one or more sets, among the plurality of sets of resources, are identified based on the blind decoding.

17. A base station in a wireless communication system, the base station comprising:
a transceiver and
at least one processor configured to:
transmit, to one or more user equipments (UEs) via the transceiver, configuration information indicating that contents of downlink control information (DCI) are segmented into a plurality of segments, wherein lengths of the plurality of segments are the same,
segment the contents of DCI into the plurality of segments based on the configuration information, and
transmit the DCI across multiple bandwidth parts (BWPs) to one or more UEs via the transceiver.

18. The base station of claim 17, wherein the configuration information is transmitted via a medium access control (MAC) control element (CE).

19. The base station of claim 17, wherein a blind decoding is performed on a first segment within a first BWP.

20. The base station of claim 19, wherein locations of the other segments, among the plurality of segments, are identified by the blind decoding.

* * * * *